UNITED STATES PATENT OFFICE.

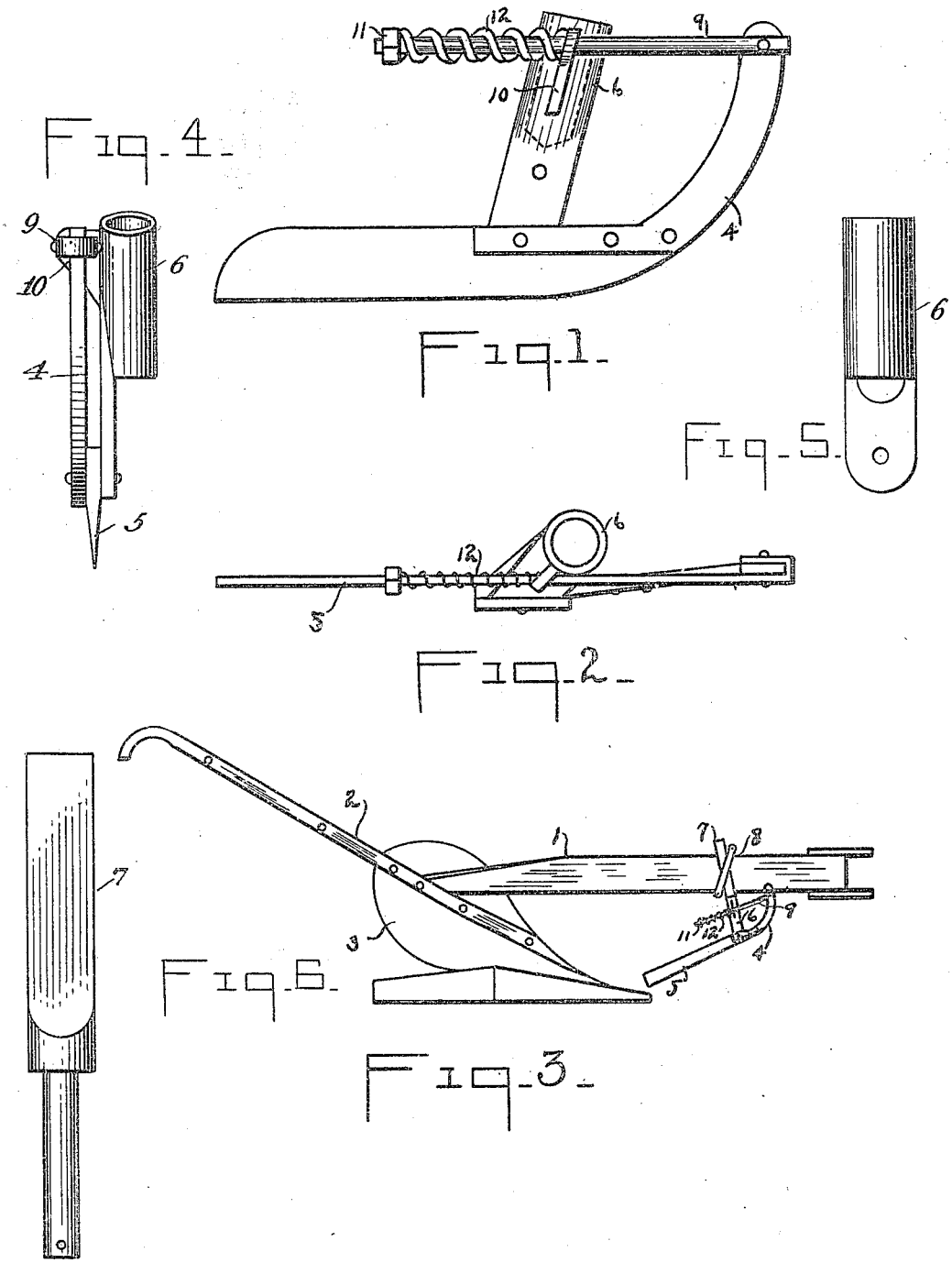

WILLIAM STACY, OF DEVERS, TEXAS.

COLTER.

959,637.  Specification of Letters Patent.  Patented May 31, 1910.

Application filed July 31, 1909. Serial No. 510,652.

*To all whom it may concern:*

Be it known that I, WILLIAM STACY, a citizen of the United States, residing at Devers, in the county of Liberty and State of Texas, have invented certain new and useful Improvements in Colters, of which the following is a specification.

My invention relates to new and useful improvements in colters, and more particularly to such devices as are designed to be attached to plows, binders, harvesters and other similar implements.

The object of the invention is to provide a device of the character described which may be attached to a plow beam in advance of the share, and, when so attached, will cut away all tangled and obstructing vegetation as well as cut the sod preparatory to the entrance of the share.

A further feature resides in the provision of a device of the character described which will be easily constructed and simple in its operation.

With the above and other objects in view my invention relates to certain novel features of construction and operation an example of which is given in this specification and illustrated in the accompanying drawings, wherein:—

Figure 1 is a side elevation of my improved colter. Fig. 2 is a plan view thereof. Fig. 3 is a side elevation of the colter showing the same attached to the beam of a plow. Fig. 4 is a front elevation of the device. Fig. 5 is a side elevation of the female member. Fig. 6 is a side elevation of the male member.

Referring now more particularly to the drawings, wherein like numerals of reference designate similar parts in each of the figures, the numeral 1 refers to the plow beam, which is provided with the usual handles 2 and which carries the usual moldboard 3. The plow beam is designed to carry the colter, as shown in Fig. 3. This colter includes an arcuate cutting member 4 which carries a rearwardly extending blade 5. The cutting member is pivotally attached to a downwardly extending support which has a swivel joint intermediate its ends, and is composed of a female joint member 6 and a male joint member 7, the lower end of the male member operating within the female member. The male member is secured to the plow beam by means of a suitable clamp 8 and projects downwardly into a sleeve carried by the extreme upper end of the female member. The forward, or free end, of the member 4 is pivoted to a rearwardly extending rod 9 which extends through an aperture in an ear 10, which is carried by the female member 6. The rear or free end of this rod carries a suitable nut 11. Interposed between this nut and the ear 10 is a coil spring 12 carried by the rod 9 and operating against said nut and ear and normally holding the blade in contact with the ground. This cutting blade 5 is designed to move in advance of the share point and is normally alined therewith, and is provided for the purpose of cutting the vegetation in front of the share as well as for the purpose of cutting the sod in advance of the share. In case the blade encounters any obstruction which it is unable to penetrate it is elevated by said obstruction and rides over the same. This elevation of the blade causes a forward movement of the free end of the arcuate member 4 and forces the rod 9 to slide forwardly through ear 10 and the spring 12 is thereby compressed. As soon as the obstruction is passed said spring 12, operating against nut 11 forces rod 9 rearwardly, and the movement of said rod has the effect of forcing blade 5 downwardly and into contact with the vegetation and sod to be cut thereby.

What I claim is:—

1. A device of the character described comprising a supporting means; a blade support pivotally attached thereto; a cutter carried by said support and resilient means operating against said blade support for holding the cutter yieldably against the obstruction to be removed thereby.

2. A device of the character described including a rotatable support and means for securing the same to an implement frame; a cutting member carried thereby; a blade carried by said cutting member; a rod secured to the said cutting member and having a slidable resilient connection with said support whereby said blade is held yieldably against the obstruction to be cut thereby.

3. In a device of the character described, a cutting member; a blade carried thereby; a female joint member attached to said cutting member and carrying a laterally projecting ear; a stay rod attached to said cutting member and projecting through said ear and carrying a resilient mechanism for operating against said rod and ear and thereby operated to hold said blade yieldably against the surface to be cut.

4. A device of the character described comprising a supporting means; a blade support attached thereto; a cutter carried by said support and resilient means operating against said blade support for holding the cutter yieldably against the obstruction to be removed thereby.

In testimony whereof I have hereto set my hand this the 20th day of July A. D. 1909.

WILLIAM STACY.

In the presence of—
Wm. A. Cathey,
E. C. Guy.